United States Patent
Nishida et al.

(10) Patent No.: US 8,134,324 B2
(45) Date of Patent: Mar. 13, 2012

(54) PARALLEL MECHANISM

(75) Inventors: Tatsuhiko Nishida, Kyoto (JP); Hideaki Nakanishi, Kyoto (JP); Manabu Yamashita, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 376 days.

(21) Appl. No.: 12/468,155

(22) Filed: May 19, 2009

(65) Prior Publication Data
US 2009/0301253 A1  Dec. 10, 2009

(30) Foreign Application Priority Data

Jun. 10, 2008  (JP) .................................. 2008-151484
Feb. 18, 2009  (JP) .................................. 2009-035544

(51) Int. Cl.
*B25J 15/02* (2006.01)
(52) U.S. Cl. .................. 318/568.21; 318/567
(58) Field of Classification Search .............. 318/567, 318/568.21; 414/735
See application file for complete search history.

(56) References Cited

U.S. PATENT DOCUMENTS

| | | | |
|---|---|---|---|
| 4,806,068 A * | 2/1989 | Kohli et al. | 414/735 |
| 5,333,514 A * | 8/1994 | Toyama et al. | 74/490.06 |
| 5,715,729 A * | 2/1998 | Toyama et al. | 74/490.03 |
| 6,425,177 B1 * | 7/2002 | Akeel | 29/714 |
| 6,543,987 B2 * | 4/2003 | Ehrat | 414/735 |
| D619,632 S * | 7/2010 | Feng | D15/199 |
| 2006/0182602 A1 * | 8/2006 | Schuler et al. | 414/735 |
| 2007/0113700 A1 * | 5/2007 | Khajepour et al. | 74/490.03 |

FOREIGN PATENT DOCUMENTS

| | | |
|---|---|---|
| EP | 1 063 072 A1 | 12/2000 |
| JP | 04-002482 A | 1/1992 |
| JP | 11-048091 A | 2/1999 |
| JP | 2001-001378 A | 1/2001 |

OTHER PUBLICATIONS

Official Communication issued in corresponding Japanese Patent Application No. 2008-151484, mailed on Apr. 13, 2010.
Nishida et al.;"Parallel Mechanism"; U.S. Appl. No. 12/416,235, filed Apr. 1, 2009.
Nishida et al.;"Parallel Mechanism"; U.S. Appl. No. 12/416,241, filed Apr. 1, 2009.
Nishida et al., "Parallel Mechanism", U.S. Appl. No. 13/226,629, filed Sep. 7, 2011.

* cited by examiner

*Primary Examiner* — Thomas Dougherty
(74) *Attorney, Agent, or Firm* — Keating & Bennett, LLP

(57) ABSTRACT

A parallel mechanism includes a base portion, a bracket to which an end effecter is attached, a plurality of actuators attached to the base portion, a plurality of arms through which the plurality of actuators and the bracket are coupled together in parallel, and a control device arranged to control the actuators. When the end effecter in a stopped state is moved to a target position, the control device is arranged to control the actuators so that a level of acceleration at which the end effecter is accelerated is higher than a level of deceleration at which the end effecter is decelerated.

5 Claims, 11 Drawing Sheets ately 324 B2

PARALLEL MECHANISM

CROSS-REFERENCE TO RELATED APPLICATIONS

This application claims priority under 35 U.S.C. 119 to Japanese Patent Applications No. 2008-151484, filed on Jun. 10, 2008 and No. 2009-035544, filed on Feb. 18, 2009, which applications are hereby incorporated by reference in its entirety.

BACKGROUND OF THE INVENTION

1. Field of the Invention

The present invention relates to a parallel mechanism, and in particular, to a parallel mechanism having a turning shaft.

2. Description of Related Art

A conventionally known parallel mechanism includes a base portion that is a support base and a bracket with an end effecter attached thereto are coupled together in parallel through a plurality of links. In the parallel mechanism, for example, actuators such as electric motors are arranged in parallel, and the plurality of links (arms) coupled to each of the electric motors eventually operate the single end effecter.

Compared to a joint mechanism such as a serial mechanism, the parallel mechanism configured as described above eliminates the need to provide an electric motor or the like for each joint and to swing around the electric motor or the like provided in the joint. Thus, the joint mechanism can be made lightweight. Furthermore, in the parallel mechanism, the forces of all the electric motors or the like concentrate at one point, allowing a high output to be provided.

Moreover, the parallel mechanism has a triangular pyramidal structure and thus offers a high rigidity. Thus, because of the above-described characteristics, that is, the light weight, high output, and high rigidity, the parallel mechanism allows the end effecter to be operated at a very high speed. Thus, the parallel mechanism is used in, for example, applications requiring a quick repetition of an operation of moving the parallel mechanism to a conveyance target, allowing the end effecter to grip the conveyance target, and then allowing the end effecter to hold and convey the conveyance target to a predetermined position. However, when the parallel mechanism is reciprocated at high speed, the end effecter may be vibrated. Then, upon gripping the conveyance target or releasing the conveyance target at a predetermined position, the end effecter may be disadvantageously inaccurately positioned. Thus, there has been a demand for allowing the end effecter to be accurately positioned upon reaching the target position, without an increase in time required for the reciprocation (that is, a demand for reducing the misalignment of the end effecter when the end effecter grips or releases the conveyance target).

Furthermore, a parallel mechanism according to a certain conventional technique includes a nested link mechanism (turning shaft) that couples a gripper (end effecter) rotatably supported on a carrier (bracket) to a servo motor fixed to a base portion. The opposite ends of the link mechanism are connected through Cardan joints (universal joints). Thus, even when the link mechanism is tilted as the end effecter moves, the rotational driving force of an electric motor can be transmitted to the end effecter, which can thus be rotated.

The parallel mechanism configured as described above is suitably used for applications such as a palletizing operation which require a quick repetition of an operation of, for example, moving the parallel mechanism to a conveyance target, such as a packaged food or a solar cell, allowing the end effecter to grip the conveyance target, and then allowing the end effecter to hold and convey the conveyance target to a predetermined position. Here, the palletizing operation may require an operation of, for example, arranging rectangular work pieces transferred in different orientations in the appropriate orientation and then placing the arranged rectangular work pieces in a case partitioned into blocks. In this case, during the conveyance of the gripped work piece, the turning shaft and the end effecter are rotated to place the rectangular work piece in the case with the orientation (rotation angle position) of the work piece aligned with one of the blocks in the case.

Here, as described above, the turning shaft provided in the parallel mechanism is composed of mechanical elements connected together in series and including a Cardan joint (universal joint), nested shafts configured to be slidable and non-rotatable with respect to each other, and a Cardan joint; the Cardan joint, the nested shafts, and the Cardan joint are arranged in this order. When rotationally driven, the turning shaft is twisted as a result of the inertia moment and loosening of each of the mechanical elements in connection with the rotating force of the electric motor. Since the mechanical elements of the turning shaft are connected together in series as described above, the end effecter attached to the tip of the turning shaft is particularly significantly twisted. Furthermore, transmission of the rotating force from the electric motor to the end effecter suffers a time delay. Thus, after the rotation of the electric motor is stopped, the end effecter may overshoot a target rotation angle and vibrate. In particular, the twisting and vibration caused by the loosening do not substantially attenuate and thus require a long time until the twisting and vibration converge. Furthermore, in spite of a constant motor rotation number, due to a character of the universal joints, the driven shaft between the joints is subjected to variation in angular speed, angular acceleration, and torque. Thus, where the driven shaft between the joints offers a large inertia moment, the vibration of the end effecter may be affected. As a result, when the end effecter grips or places the work piece at a predetermined position (when the end effecter reaches a target position), the actual rotation angle position may deviate from the target position.

SUMMARY OF THE INVENTION

Preferred embodiments of the present invention have been made to solve the above-described problems. Accordingly, preferred embodiments of the present invention provide a parallel mechanism that enables the end effecter to be more accurately positioned when the end effecter reaches the target position without an increase in time required to reach the target position. Preferred embodiments of the present invention also provide a parallel mechanism which, when moving the end effecter to the target position while rotating the end effecter to the target rotation angle position, enables improvement of the accuracy of the rotation angle position of the end effecter having reached the target position.

As a result of examinations of the above-described problems, the present inventors have gained the following knowledge. That is, where the parallel mechanism is moved to the target position at high speed, when rapidly accelerated or stopped (decelerated), the parallel mechanism is subjected to an excitation force and rolls. The rolling is enhanced at the tip of the parallel mechanism to vibrate the end effecter. Then, when the end effecter reaches the target position, that is, when the end effecter grips or releases the conveyance target, if the vibration has not ended, the end effecter is misaligned and inaccurately positioned.

Thus, a preferred embodiment of the present invention provides a parallel mechanism in which a plurality of actuators attached to a base portion and a bracket with an end effecter attached thereto are coupled together in parallel through a plurality of arms, the parallel mechanism preferably includes a control device arranged to control the actuators, wherein when the end effecter in a stopped state is moved to a target position, the control device controls the actuators so that a level at which the end effecter is accelerated is higher than a level at which the end effecter is decelerated.

According to the present preferred embodiment, when the end effecter is moved to the target position, the level of the deceleration is reduced to restrain the magnitude of the deceleration. Thus, a possible excitation force during the deceleration is reduced. This enables a reduction in the vibration of the end effecter when the end effecter reaches the target position. On the other hand, the level of the acceleration is increased to inhibit an increase in time required to allow the end effecter to reach the target position. As a result, upon reaching the target position, the end effecter can be more accurately positioned without an increase in time required to allow the end effecter to reach the target position.

In a preferred embodiment of the present invention, when the end effecter in the stopped state is moved to the target position, the control device preferably controls the actuators so that a time in which the end effecter is accelerated is shorter than a time in which the end effecter is decelerated.

Thus, the deceleration time can be lengthened to sufficiently reduce possible vibration during the deceleration of the end effecter. On the other hand, the acceleration time is shortened so that an increase in total time required to allow the end effecter to reach the target position is inhibited. As a result, upon reaching the target position, the end effecter can be more accurately positioned without an increase in time required to allow the end effecter to reach the target position.

In a preferred embodiment of the present invention the control device, preferably, pre-stores a speed control pattern specifying a relationship between time elapsed from a start of driving and a target speed of the end effecter, to control the actuators based on a current position of the end effecter, the target position, and the speed control pattern.

Thus, acquisition of the current and target positions of the end effecter enables the target movement position of the end effecter, that is, the target driving amounts of the actuators, to be determined based on the speed control pattern.

In a preferred embodiment of the present invention the speed control pattern is preferably defined such that the time required to allow the end effecter in the stopped position to reach the target position is set to remain the same as in a case where the time for which the end effecter is accelerated is the same as the time for which the end effecter is decelerated.

Thus, when the end effecter in the stopped state is moved to the target position, the above-described arrangement enables reliable prevention of a possible increase in time compared to the case where the acceleration time is the same as the deceleration time.

In a preferred embodiment of the present invention, electric motors are preferably used as the actuators, for example.

In the preferred embodiments of the present invention described above, when the end effecter in the stopped state is moved to the target position, the actuators are preferably controlled such that the level of the acceleration of the end effecter is higher than the level of the deceleration of the end effecter. Thus, upon reaching the target position, the end effecter can be more accurately positioned without requiring an increase in time required to allow the end effecter to reach the target position.

Another preferred embodiment of the present invention provides a parallel mechanism in which a base portion and a bracket with an end effecter rotatably attached thereto are coupled together in parallel through a plurality of links. The parallel mechanism preferably includes a motor attached to the base portion, a turning shaft having one end connected to an output shaft of the motor and other end connected to the end effecter, to transmit a rotational driving force of the motor to the end effecter, and a control device controlling the motor. The control device is arranged to control the motor so that when the turning shaft, in a stopped state because angular speed of the motor is zero, is rotated to a target rotation angle position, a rotational acceleration time required to increase the angular speed of the motor from zero to a maximum value is set to be shorter than a rotational deceleration time required to reduce the angular speed of the motor from the maximum value to zero.

According to this preferred embodiment of the present invention, the rotational deceleration time of the motor (that is, the turning shaft) lengthens to reduce twisting and vibration of the turning shaft. On the other hand, the acceleration time shortens to inhibit an increase in time required to rotate the turning shaft to the target rotation angle position. As a result, the accuracy of the rotation angle position of the end effecter having reached the target position can be improved with a possible increase in motor rotation time prevented.

In the another preferred embodiment of the present invention when the turning shaft in the stopped state is rotated to the target rotation angle position, the control device is, preferably, arranged to control the motor so that an angular acceleration for an increase in the angular speed of the motor and an angular acceleration for a reduction in the angular speed of the motor are constant and so that absolute value of the angular acceleration for acceleration is larger than that of the angular acceleration for deceleration.

In this case, when the turning shaft is rotated to the target rotation angle position, the angular acceleration for the rotational deceleration is reduced to restrain the magnitude of the deceleration. Thus, a possible excitation force during deceleration is reduced so that possible twisting and vibration of the turning shaft can be reduced. On the other hand, the angular acceleration for the rotational acceleration is increased so that an increase in time required to rotate the turning shaft to the target rotation angle position can be inhibited. As a result, the accuracy of the rotation angle position of the end effecter having reached the target position can be improved without an increase in rotation time.

In this preferred embodiment of the present invention the control device, preferably, starts rotating the motor when the end effecter in a stopped state has moved upward by at least a predetermined elevation distance.

Thus, for example, when the end effecter is rotated, a work piece can be prevented from coming into contact with the edge of a case into or out from which the work piece is carried or with an obstacle located around a conveyor. Furthermore, with, for example, the possible contact of the work piece prevented, rotation of the work piece can be started earlier. Thus, after the rotation is stopped, a longer time can be provided to converge the possible twisting and vibration in the rotating direction.

In this preferred embodiment of the present invention the control device is preferably arranged to control the motor so that the rotation of the motor is stopped before the end effecter lowers by a preset predetermined lowering distance. Furthermore, the control device is preferably arranged to control the motor so that time from the stop of rotation of the motor until the stop of the end effecter at the target position is longer than time until the end effecter having lowered by the predetermined lowering distance is stopped at the target position.

Thus, the work piece can be prevented from coming into contact with the case or the like. Furthermore, after the motor is stopped, an appropriate time can be provided to converge the possible twisting and vibration of the end effecter in the rotating direction.

In another preferred embodiment of the present invention, the parallel mechanism preferably further includes a setting device arranged to set control data of the motor for the control device based on a user's operation. Based on the user's operation, the setting device is arranged to set the rotational acceleration time and rotational deceleration time for the motor and a maximum angular speed of the motor. Based on the rotational acceleration time, rotational deceleration time, and maximum angular speed set by the setting device, the control device controls the motor.

Thus, the motor can be appropriately controlled. Furthermore, a change in, for example, the work piece, the end effecter, or a line to which applies the parallel mechanism can be dealt with flexibly.

In another preferred embodiment of the present invention, the control device is preferably arranged to control the motor so that a rotation angle of the turning shaft is at most about 180 degrees.

For example, when the turning shaft needs to be rotated clockwise through greater or equal to about 180 degrees, counterclockwise rotation allows the turning shaft to be located at the same rotation angle position through a rotation angle of less or equal to about 180 degrees. This enables a reduction in an amount of time required for the rotation and an increase in time required to converge the possible twisting and vibration in the rotating direction. Furthermore, air tubes and wires connected to the end effecter can be prevented from being excessively twisted.

In the another preferred embodiment of the present invention, the control device is preferably arranged to control the motor so that the time from the stop of the rotation of the motor until the stop of the end effecter at the target position is greater or equal of a predetermined time.

Thus, after the rotation of the motor is stopped, an appropriate time can be reliably provided to converge the possible twisting and vibration of the end effecter in the rotating direction.

According to various preferred embodiments of the present invention described above, when the end effecter is moved to the target position in a three-dimensional space while being rotated to the target rotation angle portion, the accuracy of the rotation angle position of the end effecter having reached the target position can be improved without an increase in rotation time.

Other features, elements, processes, steps, characteristics and advantages of the present invention will become more apparent from the following detailed description of the preferred embodiments of the present invention with reference to the attached drawings.

DETAILED DESCRIPTION OF PREFERRED EMBODIMENTS

Figure 1:
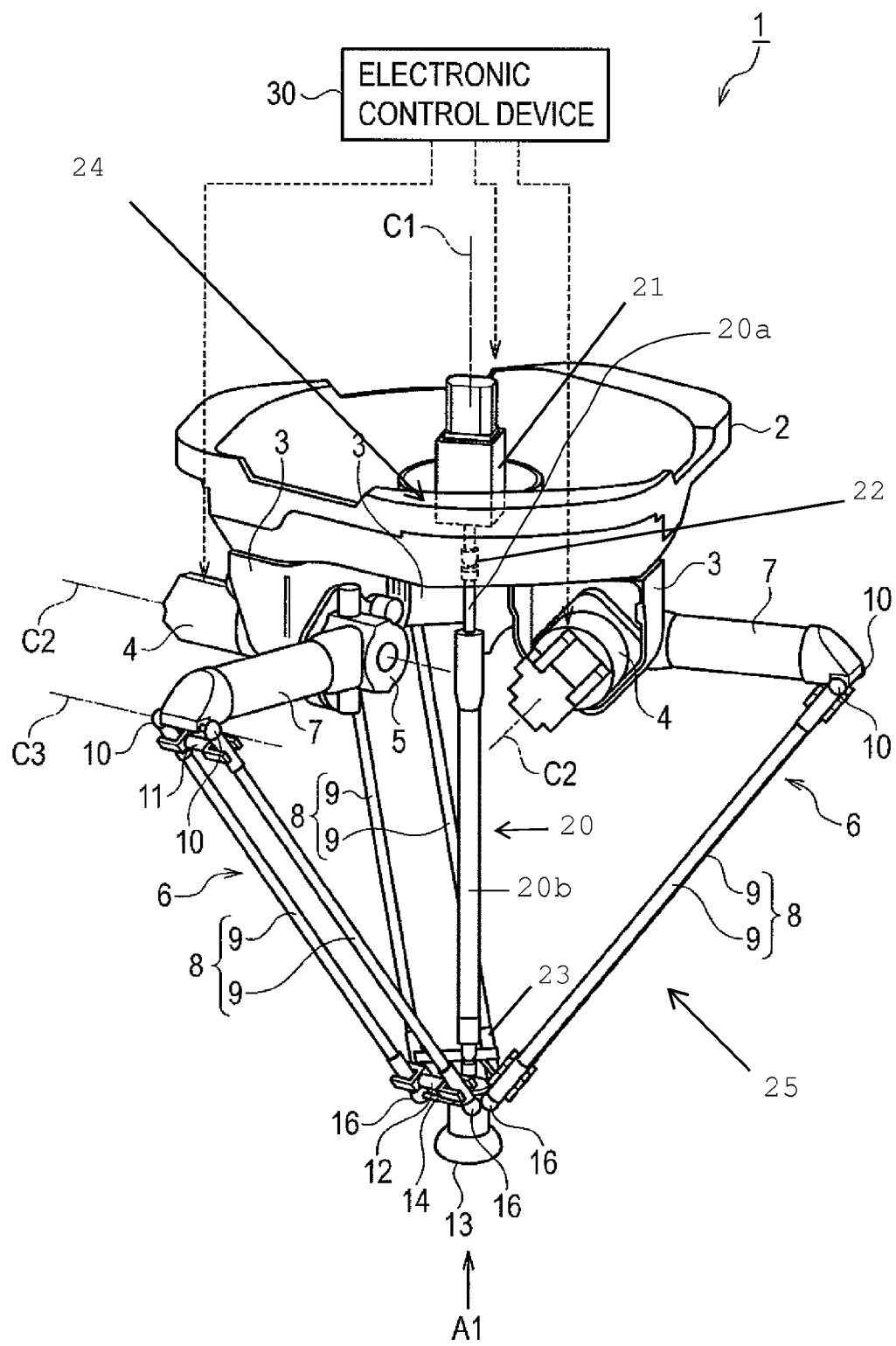
FIG. 1 is a perspective view showing the general configuration of a parallel mechanism according to a preferred embodiment of the present invention.

Preferred embodiments of the present invention will be described below in detail with reference to the drawings. In the drawings, the same elements are denoted by the same reference numerals, and duplicate descriptions are omitted.

Figure 2:
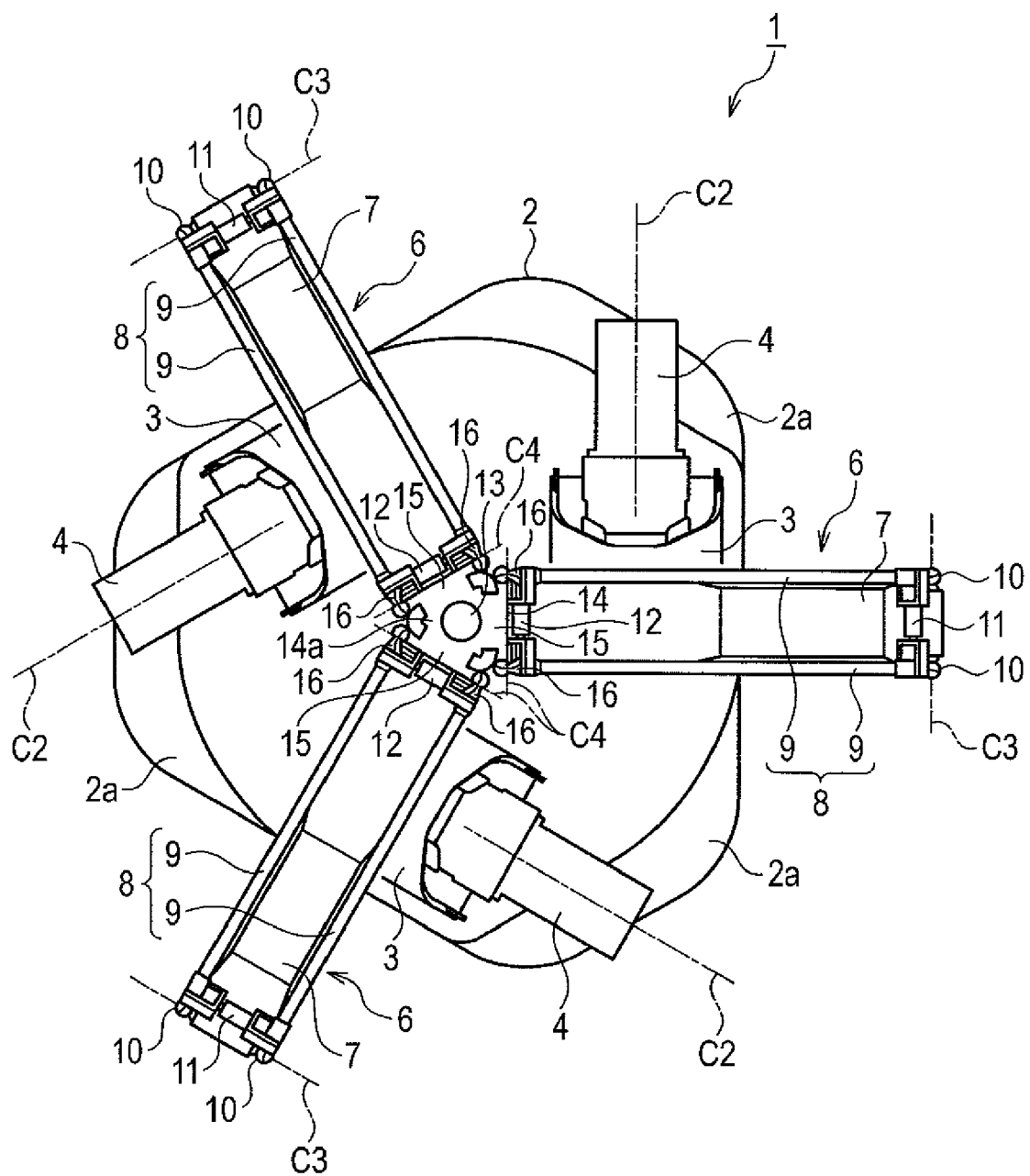
FIG. 2 is a diagram showing the parallel mechanism as viewed from the direction of arrow A1 in FIG. 1.

First, the general configuration of a parallel mechanism according to the preferred embodiment will be described with reference to FIGS. 1 and 2. FIG. 1 is a perspective view showing the general configuration of the parallel mechanism 1 according to a preferred embodiment of the present invention. Furthermore, FIG. 2 is a diagram showing the parallel mechanism 1 as viewed from the direction of arrow A1 in FIG. 1.

The parallel mechanism 1 has a base portion 2 at the top thereof. A flat mounting surface 2a defined on the bottom surface side of the base portion 2 is fixed to, for example, a horizontal ceiling in order to support the parallel mechanism 1.

Three support members 3, for example, are provided on the bottom surface side of the base portion 2. Electric motors 4 are preferably supported on the respective support members 3. Each of the electric motors 4 is supported such that the axis C2 of a motor shaft is parallel or substantially parallel (that is, horizontal or substantially horizontal) to the mounting surface 2a of the base portion 2. The respective support members 3 are arranged at equal or substantially equal angle intervals (about 120 degrees) around the vertical axis C1 of the base portion 2. The electric motors 4 are also arranged at equal or substantially equal angle intervals (about 120 degrees) around the vertical axis C1 of the base portion 2 (see FIG. 2).

An arm support member 5 that is preferably shaped substantially like a hexagonal column is fixed to an output shaft of each of the electric motors 4 coaxially or substantially coaxially to an axis C2. The electric motor 4 is driven to rotate the arm support member 5 around the axis C2. Each of the electric motors 4 is connected to an electronic control device 30 including a motor driver. Rotation of the output shaft of the electric motor 4 is controlled by the electronic control device 30.

The parallel mechanism 1 has three arm main bodies 6. Each of the arm main bodies 6 preferably includes a first arm 7 and a second arm 8. The first arm 7 is preferably an elongate, hollow cylindrical member formed of, for example, a carbon fiber material. The base end of the first arm 7 is attached to a side surface of the corresponding arm support member 5. The first arm 7 is preferably fixed such that the axis thereof is orthogonal or substantially orthogonal to the above-described axis C2.

The base end of the second arm 8 is coupled to the free end of the first arm 7. Thus, the second arm 8 can be swung around the free end of the first arm 7. The second arm 8 preferably includes paired elongated rods 9. The paired rods 9 are arranged parallel or substantially parallel to each other in the longitudinal direction thereof. Each of the rods 9 is also an elongated, hollow cylindrical member formed of, for example, a carbon fiber material. The base end of the rod 9 is coupled to the free end of the first arm 7 through paired ball joints 10. An axis C3 connecting the ball joints 10 together at the base end of the rod 9 is parallel or substantially parallel to the axis C2 of the electric motor 4. Thus, the second arm 8 is swung around the axis C3.

Furthermore, at the base end of the second arm 8, one rod 9 and the other rod 9 are preferably coupled together through a coupling member 11. At the free end of the second arm 8, one rod 9 and the other rod 9 are coupled together through a coupling member 12. Each of the coupling members 11, 12 has, for example, a tension coil spring as a bias member to bias the paired rods 9 in a direction in which the rods 9 draw each other. The coupling members 11, 12 may have different structures but preferably have the same structure in order to provide reduced costs. Each of the coupling members 11, 12 has is arranged to prevent the rods 9 from rotating around an axis parallel to the longitudinal direction thereof.

Furthermore, the parallel mechanism 1 has a bracket 14 to which an end effecter 13 is pivotally movably attached. The bracket 14 is a plate-shaped member that is preferably shaped substantially like an equilateral triangle. The bracket 14 is held through three arm main bodies 6 so that a mounting surface 14a (the bottom surface of the bracket 14 in FIG. 1) of the bracket 14 to which the end effecter 13 is attached is parallel or substantially parallel (that is, horizontal or substantially horizontal) to a mounting surface 2a of the base portion 2.

Mounting pieces 15 are defined on the respective sides of the bracket 14. Each of the mounting pieces 15 is coupled to the free end of the corresponding arm main body 6 (the free ends of the paired rods 9 provided in the second arm 8) to allow the bracket 14 to swing, with respect to the arm main body 6, around the free end of the arm main body 6. Specifically, the ends of each of the mounting pieces 15 of the bracket 14 are coupled to the free ends of the corresponding rods 9 through ball joints 16. An axis C4 (see FIG. 2) connecting the paired ball joints 16 together is also parallel or substantially parallel to the axis C2 of the electric motor 4. Thus, the bracket 14 can swing around the horizontal axis C4 with respect to the corresponding arm main body 6. The bracket 14 shaped substantially like an equilateral triangle is supported at all sides thereof by the three arm main bodies 6 to be swingable around the horizontal axis C4.

The distance between the paired ball joints 10 at the coupling portion between the first arm 7 and the second arm 8 is set equal to the distance between the paired ball joints 16 at the coupling portion between each of the rods 9 of the second arm 8 and the bracket 14. Thus, as described above, the paired rods 9 provided in the second arm 8 are arranged parallel or substantially parallel to each other all over the length thereof in the longitudinal direction thereof. All of the axes C2, C3, C4 are parallel or substantially parallel to the mounting surface 2a of the base portion 2. Consequently, regardless of however the first arm 7, the second arm 8, and the bracket 14 swing around the axes C2, C3, C4, respectively, parallelism or substantial parallelism is maintained between the end effecter 13 mounting surface 14a of the bracket 14 and the mounting surface 2a of the base portion 2.

The rotating position of the arm support member 5 fixed to the output shaft of each of the electric motors 4 is controlled in response to an instruction from the electronic control device 30. Thus, the position of the free end of each of the first arms 7 is controlled. The position of the free end of each of the second arms 8 follows the controlled position of the free end of the corresponding first arm 7. As a result, the position of the end effecter 13 mounting surface 14a of the bracket 14 is determined. At this time, as described above, the bracket 14 moves with a horizontal posture maintained.

The parallel mechanism 1 further has a turning shaft rod 20 provided in the center thereof and extending downward from the base portion 2 and an electric motor 21 that rotates the turning shaft rod 20. The electric motor 21 is fixed to the base portion 2 with an output shaft thereof directed downward in the vertical direction. One end of the turning shaft rod 20 is coupled to the output shaft of the electric motor 21 through a universal joint 22 and a speed reducer 24 composed of a combination of a plurality of gears. In the present preferred embodiment, the speed reducer 24 has a reduction gear ratio of 5, for example. On the other hand, the other end of the turning shaft rod 20 is connected to the end effecter 13 through a universal joint 23. Moreover, the end effecter 13 and a lower connection portion of the universal joint 23 are rotatably fixed to the bracket 14 through bearings or the like so that the center axes of the end effecter 13 and the universal joint 23 extend in the vertical direction. The turning shaft rod 20 preferably includes a rod 20a and a cylinder 20b and is telescopic. Here, the turning shaft rod 20 is preferably a ball spline which enables rotation of the rod 20a to be transmitted to the cylinder 20b. Furthermore, since the universal joints 22, 23 are provided at the opposite ends of the turning shaft rod 20, even when the bracket 14 is drivingly moved upward, downward, forward, backward, rightward, or leftward to a predetermined position by the three electric motors 4, the turning shaft rod 20 can move following the movement of the bracket 14 to the predetermined position. An arrangement including the turning shaft rod 20 and the universal joints 22, 23 is hereinafter referred to as a turning shaft 25.

That is, the mechanical elements including the speed reducer 24, the universal joint 22, the turning shaft rod 20 (rod 20a and cylinder 20b), and the universal joint 23 are connected together in series between the electric motor 21 and the end effecter 13. The rotational driving force of the electric motor 21 is transmitted to the end effecter 13 through the mechanical elements connected together in series. The electric motor 21 is connected to the electronic control device 30. The electronic control device 30 controls rotation of the electric motor 21 and thus the rotation angle position of the end effecter 13 is controlled. In the present preferred embodiment, work pieces are assumed to be solar cell wafers, as an example, as described below. Thus, the end effecter 13 is what is called a Bernoulli chuck that can grip a work piece in a nearly non-contact manner by rapidly ejecting air through small holes to generate a negative pressure to exert a suction force. Where the work piece is, for example, a packaged food, which need not be gripped in the non-contact manner, the end effecter 13 may be a suction pad that suctions air to generate a negative pressure to suck the work piece.

As described above, the electronic control device 30 controls the three electric motors 4 to drive the arm main body 6 to move the end effecter 13 to the target position. Furthermore, the electronic control device 30 controls the electric motor 21 to drive the turning shaft rod 20 to rotate the end effecter 13 to a target rotation angle position. For example, a programmable logic controller (PLC) or a dedicated control computer is preferably used as the electronic control device 30. The electronic control device 30 is defined by, for example, a microprocessor that performs arithmetic operations, a ROM that stores programs and the like which allow the microprocessor to execute relevant processes, and a RAM that temporarily stores various data such as the results of arithmetic operations.

Furthermore, the electronic control device 30 connects to an input device 31 (shown, for example, in FIG. 7) serving as a setting device that receives an operator's operation input. For example, a touch panel display or a combination of a liquid crystal display and a keyboard are suitably used as the input device 31. The operator can use the input device 31 to set control data on the electric motors 4, 21. Here, the set control data on the electric motor 21 includes, for example, a conveyance rotation speed (deg/sec) that determines the maximum rotation speed (maximum angular speed) of the electric motor 21 required to convey the gripped work piece, a returning rotation speed that determines the maximum rotation speed (maximum angular speed) of the electric motor 21 required to allow the end effecter 13 to move to and grip the work piece, a rotational deceleration time (msec) that determines the time for which the rotation speed (angular speed) of the electric motor 21 is increased, and a rotational acceleration time (msec) that determines the time for which the rotation speed (angular speed) of the electric motor 21 is reduced. The electronic control device 30 preferably uses the set control data to execute a program stored in the ROM to drive the electric motors 4 and 21. The electronic control device 30 thus controls the position (x, y, z) in the three-dimensional space and rotation angle ($\theta$) of the end effecter 13.

Figure 3:
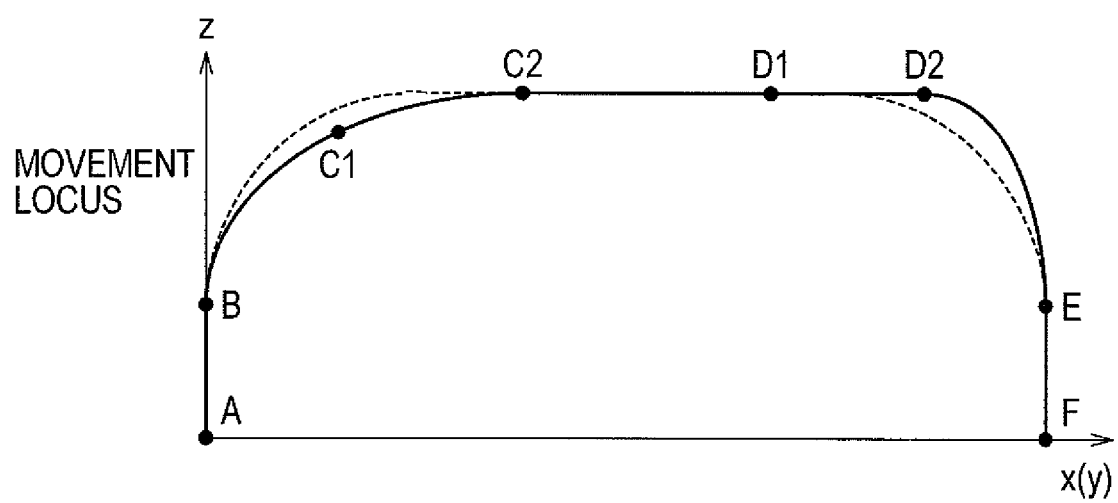
FIG. 3 is a diagram showing the movement locus of an end effecter.
Figure 4:
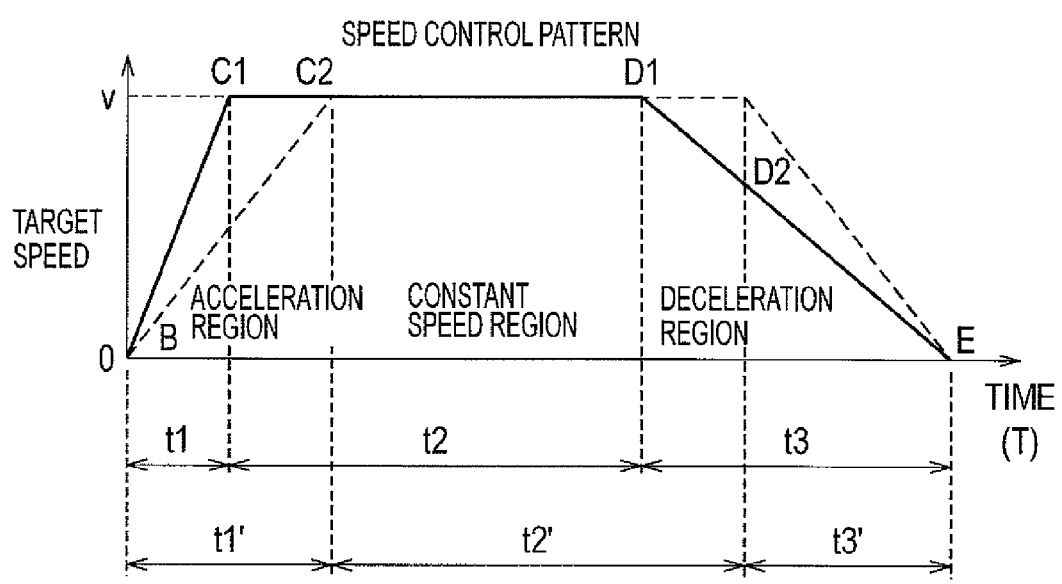
FIG. 4 is a diagram showing an example of a horizontal-direction speed control pattern for the end effecter.

Now, the operation of the parallel mechanism 1 according to a first preferred embodiment of the present invention will be described with reference to FIGS. 3 and 4. Here, the operation of the end effecter 13 in which the end effecter 13 moves to and grips a conveyance target will be described by way of example. The operation of, after gripping the conveyance target, conveying the gripped conveyance target to a predetermined position is the same as or similar to the operation described below except that the direction of the operation is reversed, and will thus not be described below. FIG. 3 is a diagram showing the movement locus (on an x (y), z plane) of the end effecter 13. FIG. 4 is a diagram showing an example of a horizontal-direction (on an x, y plane) speed control pattern for the end effecter 13. In FIGS. 3 and 4, solid lines show the movement locus and speed control pattern, respectively, of the end effecter 13 in the parallel mechanism 1 according to the first preferred embodiment. Dashed lines show the movement locus and speed control pattern, respectively, of a conventional parallel mechanism (acceleration time=deceleration time).

In FIG. 3, point A corresponds to an initial stop position (current position). Point F corresponds to the position of the conveyance target (that is, the target position for the end effecter 13 moving to and gripping the conveyance target). To move to and grip the conveyance target at the point F, the end effecter 13 stopped at the point A is raised in the vertical direction from the point A to the point B. In this section, since the end effecter 13 moves only upward in the vertical direction (z direction), the speed in the horizontal-direction (x, y direction) speed control pattern shown in FIG. 3 is zero. Then, the end effecter 13 is moved upward and in the horizontal direction from the point B to a point C1 while being accelerated in the horizontal direction. The end effecter 13 is subsequently moved upward and in the horizontal direction from the point C1 to a point C2 with the horizontal speed kept constant. The end effecter 13 is then moved in the horizontal direction from the point C2 to a point D1 at the constant speed. The end effecter 13 is further moved in the horizontal direction from the point D1 to a point D2 while being decelerated. In this case, during the movement between the point C2 and the point D2, the movement in the z direction is zero. The end effecter 13 is then moved downward and in the horizontal direction from the point D2 to a point E (the position above the target position in the vertical direction) while being decelerated in the horizontal direction. The end effecter 13 is thereafter lowered in the vertical direction from the point E to a point F. Also in this section, since the end effecter 13 moves only downward (z direction), the speed in the horizontal-direction (x, y direction) speed control pattern shown in FIG. 3 is zero. When the end effecter 13 is moved from the point A to the point F as described above, the electronic control device 30 controls the electric motor 4 based on the pre-stored speed control pattern, which specifies the relationship between the time elapsed since the start of the driving and the target speed of the end effecter 13. The movement in the horizontal direction will be more specifically described below.

First, the current position (point A) of the end effecter 13 and target position (point F) are loaded into the electronic control device 30. Here, the current position of the end effecter 13 can be determined from the driving positions of the respective electric motors 4. Furthermore, the target position can be acquired by executing image processing or the like on a picked-up image picked up with a camera attached to a predetermined position (coordinates) to recognize the conveyance target. Then, the electronic control device 30 determines the distance to the target position based on the current and target positions. The electronic control device 30 then applies the speed control pattern to the obtained distance to set an acceleration time t1, a constant speed time t2, a deceleration time t3, and a maximum speed V.

Here, as shown by the solid line in FIG. 4, the speed control pattern includes an acceleration region, a constant speed region, and a deceleration region. The level of the acceleration of the end effecter 13 is set to be higher than the level of the deceleration of the end effecter 13. Furthermore, the speed control pattern is set such that the time t1 for which the end effecter 13 is accelerated is shorter than the time t3 for which the end effecter 13 is decelerated. Moreover, the speed control pattern is set such that the time required to move from the point A to the point F (target position) is the same as in the case where the time (t1') for which the end effecter 13 is accelerated is the same as the time (t3') for which the end effecter 13 is decelerated (see the dashed line in FIG. 4). For example, when the end effecter 13 reciprocates at about 120 cycles/min., the duration (one way) between the points A and F is about 0.25 seconds, for example.

After setting the acceleration time t1, constant speed time t2, deceleration time t3, and maximum speed V, the electronic control device 30 determines the target movement position of the end effecter 13 for each control period based on the speed control pattern in which each relevant time is set. For each control period, a driving current is supplied to each of the electric motors 4 to match the target driving position with the current position. The electric motors 4 are thus driven. The electric motors 4 are driven to drive the respective arm main bodies 6 to move the end effecter 13 from the point A to the point F (target position).

Figure 5:
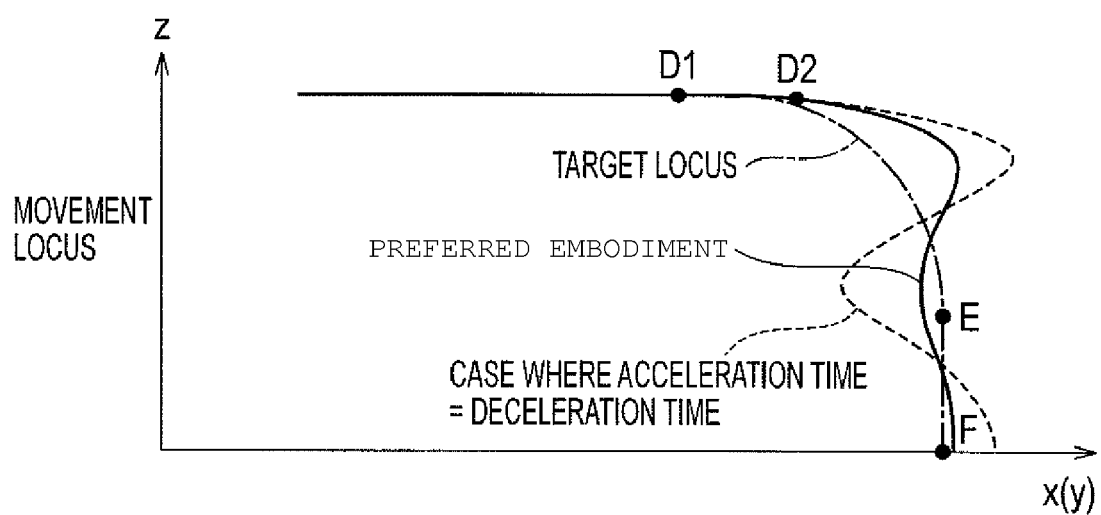
FIG. 5 is a diagram showing the target locus and actual movement locus of the end effecter.

FIG. 5 shows the movement locus of the end effecter 13 in the vicinity of the target position observed when the end effecter 13 is moved from the point A to the point F. FIG. 5 shows the target locus and actual movement locus of the end effecter 13. In FIG. 5, the alternate long and short dash line shows the target locus (target movement position) of the end effecter 13. The solid line shows the movement locus of the end effecter 13 in the parallel mechanism 1 according to the present preferred embodiment. The dashed line shows the movement locus of the end effecter observed when the acceleration time t1' is the same as the deceleration time t3'.

As shown in FIG. 5, according to the first preferred embodiment, when the end effecter 13 in a stopped state is moved to the target position (point F), the level of the deceleration is reduced to restrain the magnitude of the deceleration. Thus, a possible excitation force during the deceleration is reduced. This enables a reduction in the vibration of the end effecter 13 when the end effecter 13 reaches the target position. On the other hand, the level of the acceleration is increased to inhibit an increase in time required to allow the end effecter 13 to reach the target position. As a result, upon reaching the target position, the end effecter 13 can be more accurately positioned without an increase in time required to allow the end effecter 13 to reach the target position.

Furthermore, according to the first preferred embodiment, when the end effecter 13 in the stopped state is moved to the target position (point F), the electric motors 4 are controlled so that the time t1 for which the end effecter 13 is accelerated is shorter than the time t3 for which the end effecter 13 is decelerated. Thus, the deceleration time t3 can be lengthened to sufficiently reduce possible vibration during the deceleration of the end effecter 13. On the other hand, the acceleration time t1 is shortened so that an increase in total time required to allow the end effecter to reach the target position can be inhibited. As a result, upon reaching the target position, the end effecter 13 can be more accurately positioned without an increase in time required to allow the end effecter 13 to reach the target position.

According to the first preferred embodiment, the electric motors 4 are controlled based on the current position of the end effecter 13, target position, and speed control pattern. Thus, sensing the current and target positions of the end effecter 13 enables the target movement position of the end effecter 13, that is, instruction current values for the electric motors 4, to be determined based on the speed control pattern.

Furthermore, according to the first preferred embodiment, the speed control pattern is such that the time required to allow the end effecter 13 in the stopped state to reach the target position is set to remain the same as in the case where the time for which the end effecter 13 is accelerated is the same as the time for which the end effecter 13 is decelerated. Thus, when the end effecter 13 in the stopped state is moved to the target position, this arrangement enables reliable prevention of a possible increase in duration compared to the case where the acceleration time is the same as the deceleration time.

Figure 6:
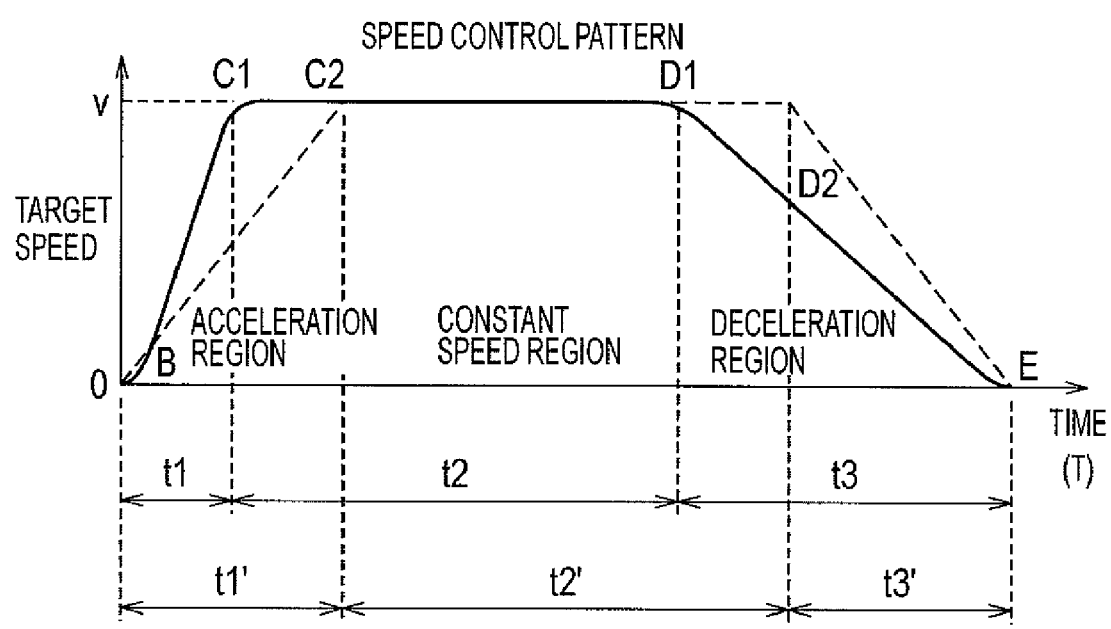
FIG. 6 is a diagram showing another example of the horizontal-direction speed control pattern.

The first preferred embodiment of the present invention has been described. However, the present invention is not limited to the above-described preferred embodiment. Many variations of the preferred embodiment are possible. For example, the speed control pattern has only to be set such that acceleration>deceleration and acceleration time<deceleration time. Furthermore, the maximum speed has only to be set to prevent an increase in total duration. The shape of the speed control pattern is not limited to that shown in FIG. 4. FIG. 6 shows another example of the speed control pattern. As shown in FIG. 6, the speed control pattern may be shaped such that the acceleration region, the constant speed region, and the deceleration region are smoothly connected together by eliminating the inflection point between the acceleration region and the constant speed region and the inflection point between the constant speed region and the deceleration region. Alternatively, the speed control pattern may be shaped such that the acceleration region and the deceleration region are connected together in the form of an "S" curve by eliminating the straight portions in the acceleration region and/or deceleration region.

In the first preferred embodiment, the movement in the horizontal direction is described as an example. However, the present invention is similarly applicable to the movement in the vertical direction. That is, the level of acceleration of the elevation of the end effecter 13 may be set to be higher than that of acceleration of the lowering of the end effecter 13 so that the acceleration time is shorter than the deceleration time. Furthermore, in the above-described preferred embodiment, the end effecter 13 moves in the vertical and horizontal directions. However, the end effecter 13 may be moved exclusively in the horizontal direction.

Figure 7:
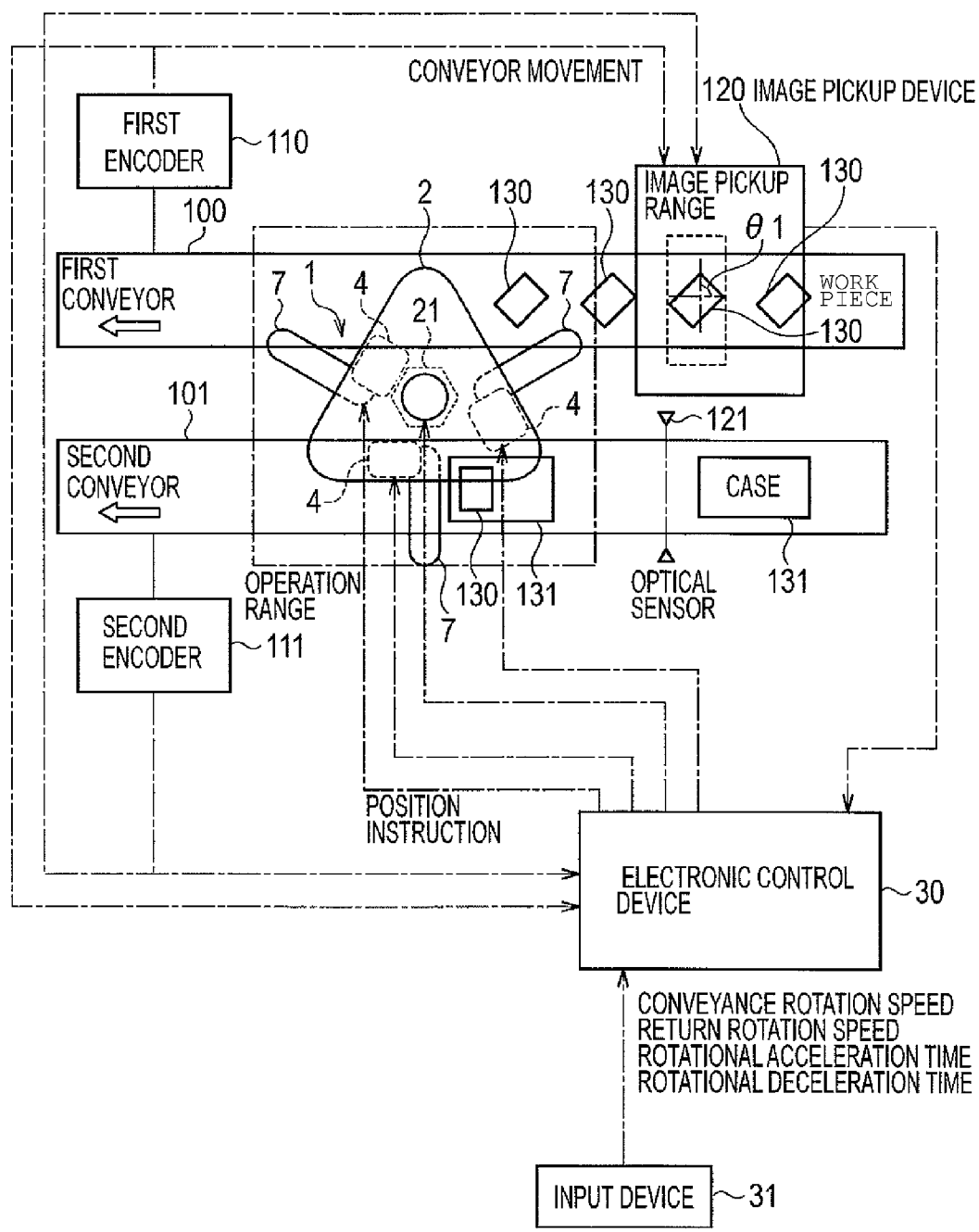
FIG. 7 is a bird's-eye view schematically illustrating a palletizing process for solar cells.
Figure 8:
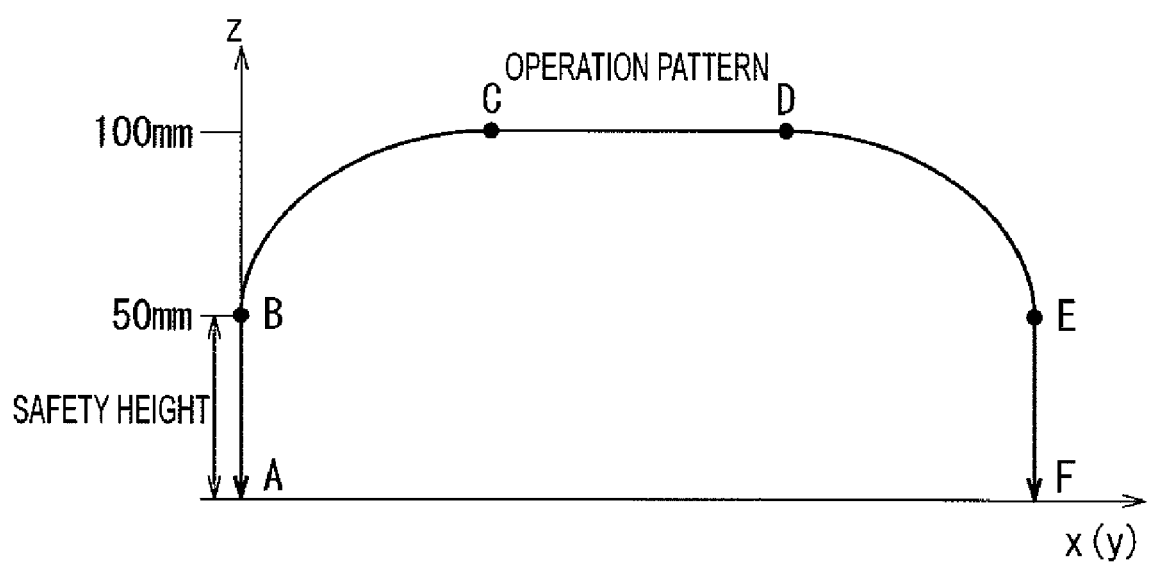
FIG. 8 is a diagram showing an operation pattern for the end effecter as viewed from the horizontal direction.
Figure 9:
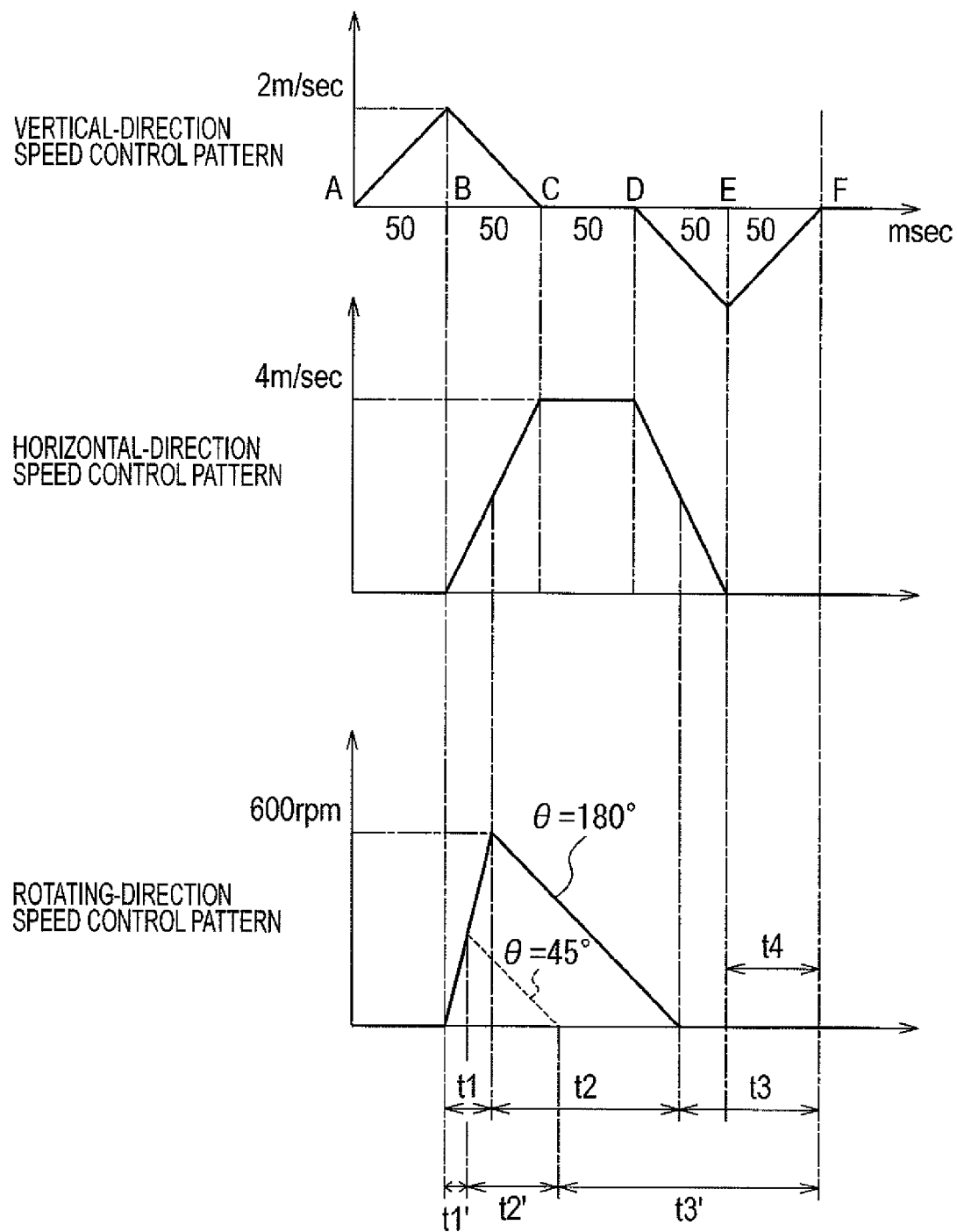
FIG. 9 is a diagram showing examples of speed control patterns (vertical direction, horizontal direction, and rotating direction) for an electric motor which are used when a movement distance in the horizontal direction is about 400 mm, for example.

Now, the operation of a parallel mechanism according to a second preferred embodiment will be described with reference to FIGS. 7 to 9. In this description, by way of example, in a palletizing process for solar cell wafers or solar cells, after the end effecter 13 grips a solar cell wafer, the end effecter 13 conveys the gripped solar cell wafer to a predetermined position (case), while adjusting the rotation angle position of the solar cell wafer. The operation of the end effecter 13 in which the end effecter 13 moves to and grips a solar cell wafer is the same as or similar to the operation described below except that the direction of the operation is reversed, and will thus not be described below. FIG. 7 is a bird's eye view illustrating the palletizing process for solar cells. FIG. 8 is a diagram showing an operation pattern for the end effecter 13 as viewed in the horizontal direction. FIG. 9 is a diagram showing examples of a horizontal (x, y)-direction speed control pattern, a vertical (x)-direction speed control pattern, and a rotating (θ)-direction speed control pattern for electric motors 4, 21 used when the end effecter 13 moves in the horizontal direction by about 400 mm, for example.

First, an outline of the palletizing process for solar cell wafers will be described with reference to FIG. 7. In the process, a first conveyor 100 and a second conveyor 101 are arranged parallel or substantially parallel to each other. The parallel mechanism 1 is installed above the two conveyors 100, 101. Each of the first conveyor 100 and the second conveyor 101 preferably moves from the right to left of the figure at a predetermined speed. A solar cell wafer (hereinafter also referred to as a "work piece") 130 is on the moving first conveyor 100. Here, the solar cell wafer 130 is, for example, a rectangular, thin plate of length 156 mm, width 156 mm, and thickness 0.2 mm. On the other hand, a case 131 in which solar cell wafers 130 are aligned and placed is on the moving second conveyor 101. Here, the inside of the case 131 is, for example, partitioned into 3×6 blocks. The parallel mechanism 1 transfers the solar cell wafer 130 on the first conveyor 100, into one of the blocks in the case 131.

The parallel mechanism 1 drives arm main bodies 6 to move the end effecter 13. The end effecter 13 thus moves to and grips the solar cell wafer 130. The end effecter 13 then conveys the gripped solar cell wafer 130 to the case 131.

This series of operation is repeated. Furthermore, when the end effecter 13 grips and conveys the rectangular solar cell wafer 130, which may be transferred on the first conveyor 100 in an irregular orientation, the parallel mechanism 1 rotates the end effecter 13 to align the solar cell wafers 130 with one of the blocks in the case 131. Consequently, the parallel mechanism 1 places the solar cell wafer 131 into the block.

More specifically, a first encoder 110 is attached to the first conveyor 100 to detect the travel distance of the first conveyor 100. The first encoder 110 outputs the detected travel distance of the first conveyor 100 to the electronic control device 30. On the other hand, a second encoder 111 is attached to the second conveyor 101 to detect the travel distance of the second conveyor 101. The second encoder 111 outputs the detected travel distance of the second conveyor 101 to the electronic control device 30. Furthermore, an image pickup device 120 such as a CCD camera, is mounted above the first conveyor 100. The image pickup device 120 is arranged to pick up an image of the transferred solar cell wafer 130 to determine the position of the center of gravity and the orientation (angle) θ1 of the solar cell wafer 130. The image pickup device 120 then outputs the position and the angle to the electronic control device 30. Moreover, an optical sensor 121 is attached to the second conveyor 101 to detect the tip of the case 131. The optical sensor 121 outputs a detection signal to the electronic control device 30.

Based on the position of the center of gravity of the solar cell wafer 130 and the travel distance of the first conveyor 100, the electronic control device 30 calculates the position of the solar cell wafer 130. Furthermore, based on the detection signal for the tip of the case 131 and the travel distance of the second conveyor 101, the electronic control device 30 calculates the position of the case 131. Based on the determined positions of the solar cell wafer 130 and the case 131, the electronic control device 30 rotates the electric motors 4 to drive the arm main bodies 6 to convey the solar cell wafer 130 to the case 131. Additionally, during the conveyance of the solar cell wafer 130, based on the determined orientation θ of the solar cell wafer 130, the electronic control device 30 rotates the electric motors 4 and thus the control device 30 rotates the turning shaft (that is, the end effecter 13). Thus, the orientation of the solar cell wafer 130 is aligned with one of the blocks in the case 131. The above-described operation is repeated to align and place the solar cell wafer 130, transferred on the first conveyor 100, into the case 131 transferred on the second conveyor 101.

Now, a method for controlling the electric motors 4, 21, that is, a method for controlling the three-dimensional space position (x, y, z) and rotation angle position (θ) of the end effecter 13, will be described. In FIG. 8, a point A corresponds to an initial stop position (work piece grip position). The point F corresponds to the position of the intended block in the case (that is, the target position for the conveyance of the gripped work piece 130). The end effecter 13 is temporarily stopped at the point A to grip the work piece 130 and then conveys the work piece 130 to the point F. In this case, first, the end effecter 13 is raised in the vertical direction from the point A to the point B with the horizontal position thereof unchanged (see the vertical-direction speed control pattern in the upper stage of FIG. 9). In this section, since the end effecter 13 moves only upward in the vertical direction (z direction), the speed in the horizontal-direction (x, y direction) speed control pattern shown in the middle stage of FIG. 9 is zero. Then, the end effecter 13 is moved upward and in the horizontal direction from the point B to the point C while being accelerated in the horizontal direction.

Then, the end effecter 13 is moved in the horizontal direction from the point C to a point D at a constant speed (about 4 m/sec, for example). During the movement between the point C and the point D, the movement in the z direction is zero. The end effecter 13 is then moved downward and in the horizontal direction from the point D to the point E (the position above the target position in the vertical direction) while being decelerated in the horizontal direction. The end effecter 13 is thereafter lowered in the vertical direction from the point E to the point F with the horizontal position thereof unchanged. Also in this section, since the end effecter 13 moves only downward (z direction), the speed in the horizontal-direction (x, y direction) speed control pattern shown in FIG. 9 is zero. When the end effecter 13 is moved from the point A to the point F as described above, the electronic control device 30 controls the three electric motor 4 based on the pre-stored speed control patterns (see the patterns in the upper and middle stages of FIG. 9), which specify the relationship between the time elapsed since the start of the driving and the target speeds of the end effecter 13 in the vertical and horizontal directions.

On the other hand, when the end effecter 13 rises above the point B, positioned about 50 mm, for example, above the work piece grip position, that is, when the end effecter 13 is located above a predetermined safety height (corresponding to a predetermined elevation distance) at which even though the end effecter 13 is rotated, the work piece 130 avoids coming into contact with the surroundings, the electric motor 21 is driven to start rotating the turning shaft 25 (that is, the end effecter 13) (see the rotating-direction speed control pattern in the lower stage of FIG. 9). For example, the turning shaft 25 may be rotated through about 180 degrees according to the rotating-direction speed control pattern shown in the lower stage of FIG. 9 by the solid line. That is, during t1 (msec), the stopped electric motor 21 is rotated and the rotation of the electric motor 21 is accelerated up to 600 (rpm) (the number of rotations of the shaft of a speed reducer 24 with conformal acceleration). Then, during t2 (msec), the rotation is decelerated from 600 (rpm) to 0 (rpm) with conformal acceleration. At this time, the rotation of the electric motor 21 is stopped at a position higher than the safety height (corresponding to the predetermined elevation distance, the distance from the position from which the electric motor is lowered, to the target position); the safety height during elevation may be different from that during lowering). After the rotation of the electric motor 21 is stopped, time t3 (msec) from the start of lowering of the end effecter 13 until the stop of the lowering at point F (target position) is provided.

The electronic control device 30 performs a control such that the rotational deceleration time t2 is longer than the rotational acceleration time t1 and such that the absolute value of the angular acceleration during the rotational deceleration is lower than the absolute value of the angular acceleration during the rotational acceleration. This allows a reduction in the possible twisting and vibration of the turning shaft 25 during the rotational deceleration. Moreover, a vibration convergence time t3 is set between the stop of rotation of the electric motor 21 and the stop of rotation of the electric motors 4. This allows a sufficient reduction in the possible twisting and vibration of the turning shaft 25. For example, to rotate the turning shaft 25 through 45 degrees, the electric motor 21 is driven according to the rotating-direction speed control pattern shown in the lower stage of FIG. 6 by the dashed line. That is, the angular acceleration during the rotational acceleration and the angular acceleration during the rotational deceleration are each the same as in the case where the turning shaft 25 is rotated through about 180 degrees. The rotation acceleration time is reduced to t1' and the rotation deceleration time is reduced to t2', respectively, to provide a sufficient vibration convergence time t3'. In this manner, the electronic control device 30 controls the electric motor 21 based on the speed control pattern (see the pattern in the lower stage of FIG. 9) specifying the relationship between the time elapsed since the start of the driving and the target angular speed of the end effecter 13 in the rotating direction. The method for setting the rotating-direction speed control pattern will be more specifically described below.

First, based on a conveyance rotation speed, a rotational acceleration time, and a rotational deceleration time input by the operator through the input device 31, the electronic control device 30 determines an angular acceleration for rotational acceleration and an angular acceleration for rotational deceleration. Here, preferably, the angular acceleration for acceleration is maximized within a predetermined range, while the angular acceleration for deceleration is reduced. The maximum value of the angular acceleration is determined by the operator or a designer with the inertia moment of the turning shaft, the inertia moment of the work piece gripped by a hand of the end effecter, and the operator's hand and the capabilities of the motors (torques and the like) taken into account. Then, the orientation (angle) θ1 of the solar cell wafer 130 from the image pickup device 120 is loaded into the electronic control device 30. Here, as described above, the orientation θ1 of the solar cell wafer 130 can be obtained by executing image processing or the like on the picked-up image picked up by the image pickup device 120. Subsequently, based on preset angular accelerations for rotational acceleration and deceleration and the orientation θ1 of the solar cell wafer 130, the electronic control device 30 calculates the rotational acceleration time t1 and rotational deceleration time t2 required to rotate the orientation (angle) of the solar cell wafer 130 by −θ1, to set a rotating-direction speed control pattern. Specifically, the area of the triangle in the lower stage of FIG. 9 corresponds to the rotation amount −θ1 of the solar cell wafer 130. Thus, the rotational acceleration time t1 and the rotational deceleration time t2 are determined by specifying the angular acceleration for rotational acceleration and the angular acceleration for rotational deceleration. The maximum value of the rotation angle of the turning shaft 25 is about 180 degrees.

Here, as shown in the lower stage of FIG. 9, the rotating-direction speed control pattern includes a rotational acceleration region and a rotational deceleration region. The rotating-direction speed control pattern is set such that the level of the acceleration for an increase in the angular speed of the end effecter 13 is higher than the level of the deceleration for a reduction in the angular speed of the end effecter 13. Furthermore, the rotating-direction speed control pattern is set such that the rotational acceleration time t1 for an increase in the angular speed of the end effecter 13 is shorter than the rotational deceleration time t2 for a reduction in the angular speed of the end effecter 13. The rotating-direction speed control pattern is further set such that the time t3 from the stop of rotation of the electric motor 21 until the stop of the end effecter 13 at the target position (point F) is longer than time t4 from the start of lowering of the end effecter 13 from the above-described safety height until the stop of the end effecter 13 at the target position.

After setting the rotating-direction speed control pattern, based on such pattern, the electronic control device 30 determines the target rotation angle position of the end effecter 13 for each control period. The electronic control device 30 subsequently determines a target driving position for the electric motor 21 according to the target rotation angle position obtained. Then, during each control period, a driving current is supplied to the electric motor 21 to move the end effecter 13 from the current position to the target driving position. The electric motor 21 is thus driven. The driving of the electric motor 21 drives the turning shaft 25 to rotate the end effecter 13 by the angle θ.

Figure 11:
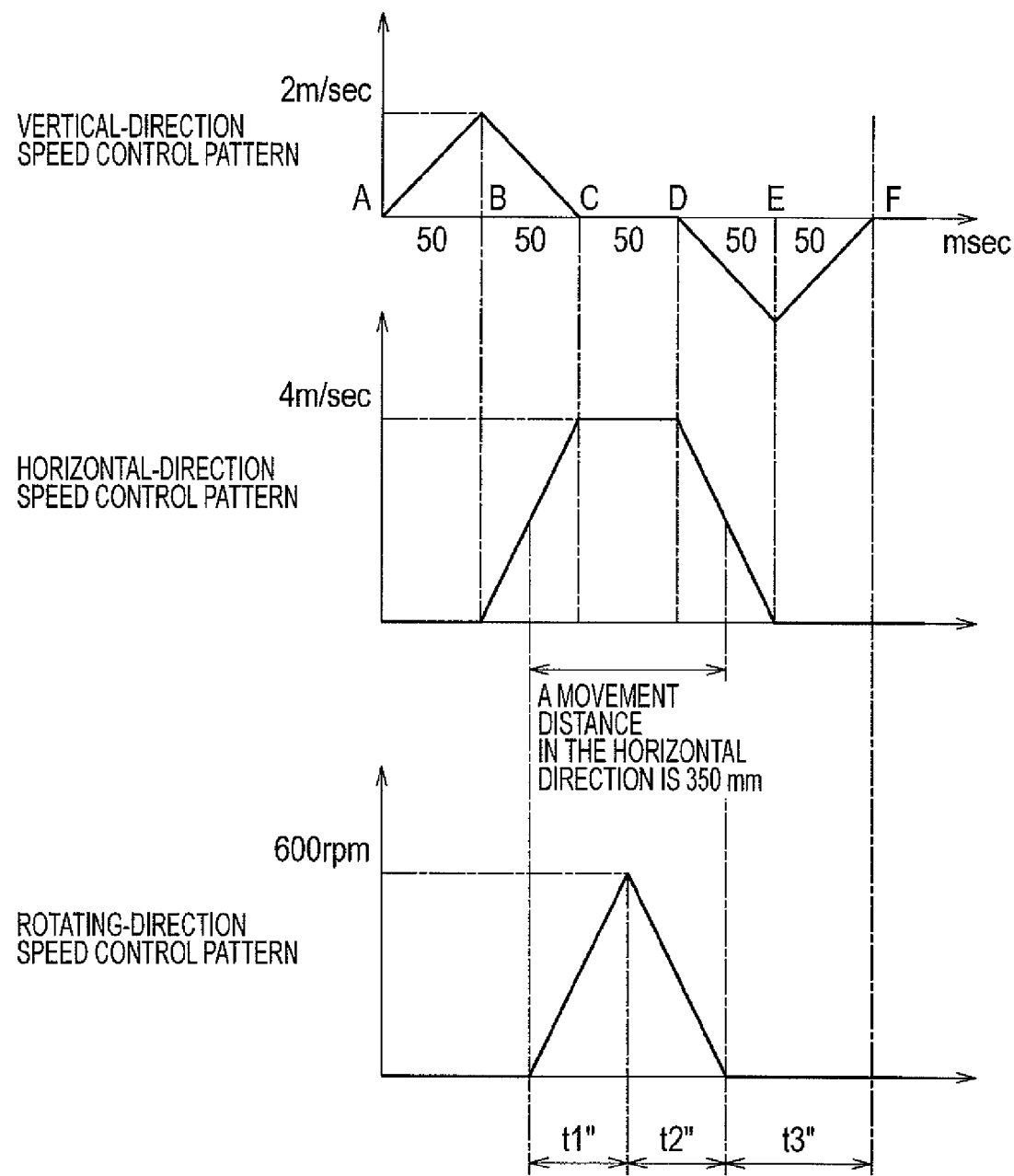
FIG. 11 is a diagram showing conventional speed control patterns (vertical direction, horizontal direction, and rotating direction).

According to the second preferred embodiment, compared to the case of the conventional rotating-direction speed control pattern shown in the lower stage of FIG. 11 such that, for example, the acceleration time t1″ for the electric motor 21 is equal to the deceleration time t2″ for the electric motor 21, and the angular acceleration for acceleration is equal to the angular acceleration for deceleration, the acceleration time t1 is set to be shorter and the deceleration time t2 is set to be longer. Additionally, the absolute value of the angular acceleration for acceleration is set high, whereas the absolute value of the angular acceleration for deceleration is set low. This reduces the possible inertia force exerted immediately before the stop of the rotation, enabling a reduction in the possible rotating vibration of the end effecter 13. On the other hand, the acceleration time is reduced, therefore, an increase in the total time required to rotate the turning shaft 25 to the target rotation angle position can be reduced. As a result, the accuracy of the rotation angle position of the end effecter 13 having reached the target position can be improved without an increase in time required to convey and rotate the work piece.

According to the second preferred embodiment, the rotation of the electric motor 21 is started immediately after the end effecter 13 rises above the predetermined safety height. Thus, for example, when the end effecter 13 is rotated, the work piece can be prevented from coming into contact with the edge of the case. The second preferred embodiment also increases the time t3 from the stop of rotation of the electric motor 21 until the end effecter 13 reaches the target position. That is, a longer time is provided to converge possible twisting and vibration in the rotating direction after the rotation is stopped.

Furthermore, according to the second preferred embodiment, the parallel mechanism 1 is controlled such that the time t3 from the stop of rotation of the electric motor 21 until the stop of the end effecter 13 at the target position is longer than the time t4 from the start of lowering of the end effecter 13 from the safety height until the stop of the end effecter 13 at the target position. This prevents the possible contact of the work piece and the like. Furthermore, an appropriate time can be provided which is required from the stop of rotation of the electric motor 21 until the possible twisting and vibration of the end effecter 13 in the rotating direction ends.

According to the second preferred embodiment, the rotational acceleration time and rotational deceleration time for the motor and the maximum angular speed of the motor are set based on the user's operation. The electronic control device 30 then controls the electric motor 21 based on the set rotational acceleration time, rotational deceleration time, and maximum angular speed. The electric motor 21 can thus be appropriately controlled. The second preferred embodiment can also deal flexibly with a change in, for example, the work piece, the end effecter 13, or a line to which applies the parallel mechanism 1.

Furthermore, according to the second preferred embodiment, the electronic control device 30 controls the electric motor 21 so that the rotation angle of the turning shaft 25 is less or equal to about 180 degrees, for example. Here, for example, if the turning shaft 25 needs to be rotated clockwise through greater or equal of about 180 degrees, counterclockwise rotation allows the turning shaft 25 to be rotated to the same rotation angle position through a rotation angle of less or equal to about 180 degrees, for example.

Thus, the present preferred embodiment enables a reduction in the time required for the rotation and an increase in twisting and vibration convergence time.

Figure 10:
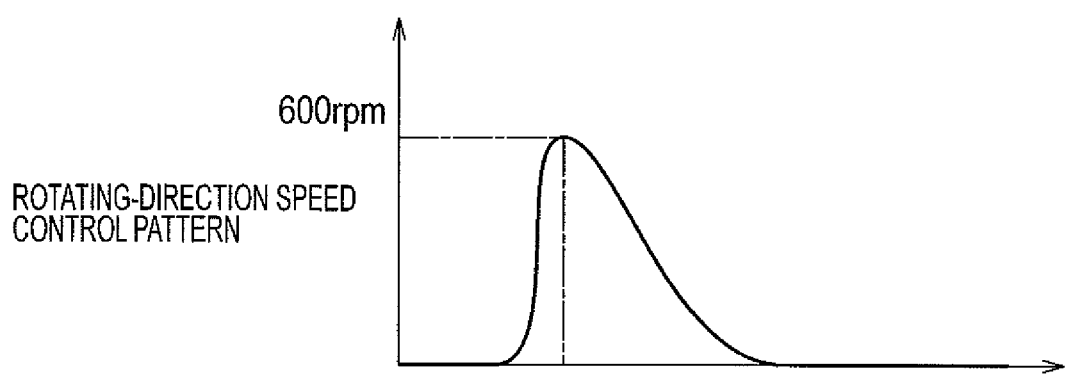
FIG. 10 is a diagram showing another example of the rotating-direction speed control pattern for a preferred embodiment of the electric motor.

The second preferred embodiment has been described. However, the present invention is not limited to the above-described preferred embodiment. Many variations of the preferred embodiment are possible. For example, the speed control pattern has only to be set such that angular acceleration for acceleration (absolute value)>angular acceleration for deceleration (absolute value) and acceleration time<deceleration time. The shape of the speed control pattern is not limited to that shown in FIG. 9. FIG. 10 shows another example of the rotating-direction speed control pattern. As shown in FIG. 10, the rotating-direction speed control pattern may be shaped such that the acceleration region and the constant speed region are smoothly connected together by eliminating the inflection point between the acceleration region and the constant speed region. Alternatively, the speed control pattern may be shaped like an S curve or a similar gently inclined pattern by eliminating the straight portions in the acceleration region and/or deceleration region. In this case, a possible variation in angular speed can be reduced at the beginning of the rotation, at the stop of the rotation, and at the change from acceleration to deceleration.

In the second preferred embodiment, the acceleration time t1 and the deceleration time t2 for the electric motor 21 are preferentially set. However, the acceleration time t1 and the predetermined stop time (vibration convergence time) t3 may first be set, and the remaining time may then set to be the deceleration time t2. This reliably provides time required to converge the possible twisting and vibration of the end effecter 13 in the rotating direction. On the other hand, an increase in deceleration time t2 enables a reduction in the time required for vibration convergence. Thus, the correlation between the angular acceleration for deceleration and the time required for vibration convergence may be pre-stored in a memory in the electronic control device 30 so that an appropriate deceleration speed pattern can be set under the condition that the acceleration time t1 is provided and that the rotation is started and ended at or above the safety height.

In the description of the second preferred embodiment, the parallel mechanism 1 is preferably applied to the palletizing process for the solar cell wafer 130 by way of example. However, the application range of the parallel mechanism 1 according to various preferred embodiments of the present invention is not limited to the palletizing process for the solar cell wafer 130. The present invention is also suitably used for, for example, a process of transferring packaged foods conveyed on a conveyor, into a corrugate fiberboard case. Furthermore, the configuration of the conveyor in the palletizing process and the like are not limited to the above-described preferred embodiments. A layout is possible in which the conveyors 100, 101 cross each other in the vertical direction.

While the present invention has been described with respect to preferred embodiments thereof, it will be apparent to those skilled in the art that the disclosed invention may be modified in numerous ways and may assume many preferred embodiments other than those specifically set out and described above. Accordingly, it is intended by the appended claims to cover all modifications of the present invention that fall within the true spirit and scope of the present invention.

What is claimed is:

1. A parallel mechanism comprising:
a base portion;
an end effecter;
a bracket to which the end effecter is attached;
a plurality of actuators attached to the base portion;
a plurality of arms through which the plurality of actuators and the bracket are coupled together substantially in parallel; and
a control device arranged to control and drive the plurality of actuators; wherein
when the end effecter, in a stopped state, is moved to a target movement position, the control device is arranged to control the plurality of actuators so that a level at which the end effecter is accelerated is higher than a level at which the end effecter is decelerated by:
storing a predetermined speed control pattern specifying a relationship between a time elapsed from a start of driving the plurality of actuators and a target speed of the end effecter;
determining the target movement position of the end effecter based on the predetermined speed control pattern;
determining a target driving position for each of the plurality of actuators according to the target movement position of the end effecter; and
controlling each of the plurality of actuators to match a current position thereof to the respective target driving position.

2. The parallel mechanism according to claim 1, wherein, when the end effecter in the stopped state is moved to the target position, the control device is arranged to control the actuators so that time for which the end effecter is accelerated is shorter than time for which the end effecter is decelerated.

3. The parallel mechanism according to claim 1, wherein the predetermined speed control pattern is set such that the time required to allow the end effecter in the stopped state to reach the target position remains the same as in a case where the time for which the end effecter is accelerated is the same as time for which the end effecter is decelerated.

4. The parallel mechanism according to claim 1, wherein the plurality of actuators are electric motors.

5. The parallel mechanism according to claim 1, further comprising:
a setting device arranged to set control data of each of the plurality of actuators for the control device based on a user's operation; wherein
the setting device is arranged to set a rotational acceleration time and a rotational deceleration time for each of the plurality of actuators and a maximum angular speed of each of the plurality of actuators based on the user's operation; and
the control device is arranged to control each of the plurality of actuators based on the rotational acceleration time, rotational deceleration time, and maximum angular speed set by the setting device.

* * * * *